United States Patent
Adl-Tabatabai et al.

(10) Patent No.: US 9,298,433 B2
(45) Date of Patent: Mar. 29, 2016

(54) OPTIMIZING INTERMEDIATE REPRESENTATION OF SCRIPT CODE FOR FAST PATH EXECUTION

(71) Applicant: Facebook, Inc., Menlo Park, CA (US)

(72) Inventors: Ali-Reza Adl-Tabatabai, San Jose, CA (US); Guilherme de Lima Ottoni, Campbell, CA (US); Michael Paleczny, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 13 days.

(21) Appl. No.: 13/886,227

(22) Filed: May 2, 2013

(65) Prior Publication Data

US 2014/0331201 A1    Nov. 6, 2014

(51) Int. Cl.
 *G06F 9/45*    (2006.01)
 *G06F 9/44*    (2006.01)

(52) U.S. Cl.
 CPC ...................... *G06F 8/443* (2013.01)

(58) Field of Classification Search
 None
 See application file for complete search history.

(56) References Cited

U.S. PATENT DOCUMENTS

| | | | | |
|---|---|---|---|---|
| 5,598,560 A * | 1/1997 | Benson | ...................... | G06F 8/52 717/159 |
| 5,649,203 A * | 7/1997 | Sites | .......................... | G06F 8/30 717/159 |
| 5,842,017 A * | 11/1998 | Hookway | .................. | G06F 8/52 717/159 |
| 5,930,509 A * | 7/1999 | Yates | ..................... | G06F 9/4552 717/159 |
| 6,260,190 B1 * | 7/2001 | Ju | ............................ | G06F 8/445 717/161 |
| 6,367,076 B1 * | 4/2002 | Imai et al. | ..................... | 717/152 |
| 6,507,947 B1 * | 1/2003 | Schreiber | ............ | G06F 17/5045 717/161 |
| 6,745,384 B1 * | 6/2004 | Biggerstaff | ................... | 717/156 |
| 7,219,329 B2 * | 5/2007 | Meijer et al. | .................. | 717/106 |
| 7,971,194 B1 * | 6/2011 | Gilboa | ....................... | G06F 8/10 717/106 |
| 8,239,823 B2 * | 8/2012 | Stenberg et al. | ............... | 717/106 |
| 8,365,156 B2 * | 1/2013 | Sollich | .......................... | 717/146 |
| 8,677,312 B1 * | 3/2014 | Braun | ....................... | G06F 8/37 717/106 |
| 8,689,202 B1 * | 4/2014 | Braun | ..................... | G06F 8/445 717/161 |
| 8,707,252 B1 * | 4/2014 | Alexeev | .................. | G06F 8/427 717/106 |
| 8,959,497 B1 * | 2/2015 | Stratton | .................. | G06F 8/456 717/161 |
| 2002/0091991 A1 * | 7/2002 | Castro | ....................... | G06F 9/06 717/106 |
| 2002/0108107 A1 * | 8/2002 | Darnell et al. | ................ | 717/153 |

(Continued)

OTHER PUBLICATIONS

IPCOM000203053OD, "Method for Flattening Conditional Statements for Frequently-Executed Code Path using Try and Catch blocks"; 2011 IP.com; [retrieved on Jan. 26, 2015]; Retrieved from the submitted NPS of PGPUB. 20140013090; pp. 1-8.*

(Continued)

*Primary Examiner* — Xi D Chen
(74) *Attorney, Agent, or Firm* — Perkins Coie LLP

(57) ABSTRACT

Disclosed here are methods, systems, paradigms and structures for optimizing intermediate representation (IR) of a script code for fast path execution. A fast path is typically a path that handles most commonly occurring tasks more efficiently than less commonly occurring ones which are handled by slow paths. The less commonly occurring tasks may include uncommon cases, error handling, and other anomalies. The IR includes checkpoints which evaluate to two possible values resulting in either a fast path or slow path execution. The IR is optimized for fast path execution by regenerating a checkpoint as a labeled checkpoint. The code in the portion of the IR following the checkpoint is optimized assuming the checkpoint evaluates to a value resulting in fast path. The code for handling situations where the checkpoint evaluates to a value resulting in slow path is transferred to a portion of the IR identified by the label.

16 Claims, 11 Drawing Sheets

(56) References Cited

U.S. PATENT DOCUMENTS

| | | | | |
|---|---|---|---|---|
| 2004/0128660 | A1* | 7/2004 | Nair et al. | 717/156 |
| 2009/0254892 | A1* | 10/2009 | Yamashita | G06F 8/458 |
| | | | | 717/161 |
| 2010/0050164 | A1* | 2/2010 | Van De Waerdt | G06F 8/45 |
| | | | | 717/159 |
| 2011/0258615 | A1* | 10/2011 | Sollich | 717/146 |
| 2012/0017197 | A1* | 1/2012 | Mehta | G06F 17/5022 |
| | | | | 717/106 |
| 2012/0233601 | A1* | 9/2012 | Gounares et al. | 717/143 |
| 2014/0013090 | A1* | 1/2014 | Zalmanovici | 712/244 |

OTHER PUBLICATIONS

Click, Paleczny, "A Simple Graph-Based Intermediate Representation"; 1995 ACM; [retrieved on Dec. 1, 2015]; Retrieved from Internet <URL:http://dl.acm.org/citation.cfm?id=202534&CFID=565233566&CFTOKEN=24001367>; pp. 35-49.*

Lee, et al., "Automatic Corpus-Based Tone and Break-Index Prediction Using K-ToBI Representation"; 2002; ACM; [retrieved on Dec. 1, 2015]; Retrieved from Internet <URL:http://dl.acm.org/citation.cfm?id=772757&CFID=565233566&CFTOKEN=24001367>; pp. 207-224.*

Zhai, et al., "Hardware Synthesis from a Recursive Functional Language"; 2015 IEEE; [retrieved on Dec. 1, 2015]; Retrieved from Internet <URL:http://ieeexplore.ieee.org/stamp/stamp.jsp?tp=&arnumber=7331371>; pp. 83-93.*

Wang, Fan, "A Smoothing Evolutionary Algorithm with Circle Search for Global Optimization"; 2010 IEEE; [retrieved on Dec. 1, 2015]; Retrieved from Internet <URL:http://ieeexplore.ieee.org/stamp/stamp.jsp?tp=&arnumber=56635578>; pp. 412-418.*

* cited by examiner

OPTIMIZING INTERMEDIATE REPRESENTATION OF SCRIPT CODE FOR FAST PATH EXECUTION

FIELD OF INVENTION

This invention relates to compilation of script code in general and more specifically to optimizing an intermediate representation (IR) of the script code for fast path execution.

BACKGROUND

Scripting languages offer simplicity and ease of development to software developers. Script code is easy to write since scripting languages are often based on a small set of expressions and statements that are simple to learn. Software developers often use scripting languages for rapid development of applications, for example, web applications. Scripting languages may be used for server side programs or for client side programs. Examples of server side scripting languages include PHP (Personal Home Page) and examples of client side scripting languages include JAVASCRIPT.

Server side script code can be used for executing a user request received at a web server by dynamically generating web pages. Server side scripting is often used for implementation of interactive websites that interface with data stores for retrieving and storing information. The PHP scripting language allows embedding of script code with hypertext markup language (HTML). Client side script code is often used for performing simple computations on the client side rather than sending a request to the server for simple computations.

Conventional approaches to execute script code include executing the script code using an interpreter. However, an interpreter may not be able to perform several optimizations that a compiler that generates executable code can perform. Therefore, interpreting script code can be inefficient compared to running executable code obtained by compiling the script code. Most compilers translate the source program first to some form of intermediate representation (IR) and convert from there into machine code. The IR is independent of the machine for which the IR is generated, and independent of the source code language it is generated from.

There are many IRs in use but these various representations are not efficient in terms of consumption of computing resources. In some situations, an execution of a destructor can have adverse effects on the code that executes following the execution of the destructor. The current IRs include code for performing checks to handle the adverse effect caused due to the execution of the destructor. However, such checks are performed at every instance a programming construct that can potentially be affected is accessed, and/or every time the program is executed. Further, these checks are executed even in situations where the likelihood of a executing a destructor is less. Accordingly, an executable code generated from the IR includes significant amount of code for performing such checks, which consumes significant computing resources.

SUMMARY

Introduced here are methods, systems, paradigms and structures for optimizing an intermediate representation (IR) of a script code for fast path execution. A fast path is typically a path that handles most commonly occurring tasks more efficiently than less commonly occurring ones. The less commonly occurring ones are handled by slow paths. The less commonly occurring tasks may include uncommon cases, error handling, and other anomalies. The IR includes checkpoints which evaluate to one of two possible values that results in either a fast path or slow path execution. The IR is optimized for fast path execution by regenerating a checkpoint as labeled checkpoint. The code for handling situations where the labeled checkpoint evaluates to a value resulting in slow path is generated in a portion of the IR identified by a label of the labeled checkpoint. The code in the portion of the IR following the labeled checkpoint is optimized assuming that the labeled checkpoint evaluates to a value resulting in fast path. The code for handling slow path situations is executed only when the labeled checkpoint evaluates to the value resulting in the slow path.

Some embodiments of the disclosed technique have other aspects, elements, features, and steps in addition to or in place of what is described above. These potential additions and replacements are described throughout the rest of the specification.

DETAILED DESCRIPTION

Figure 1:
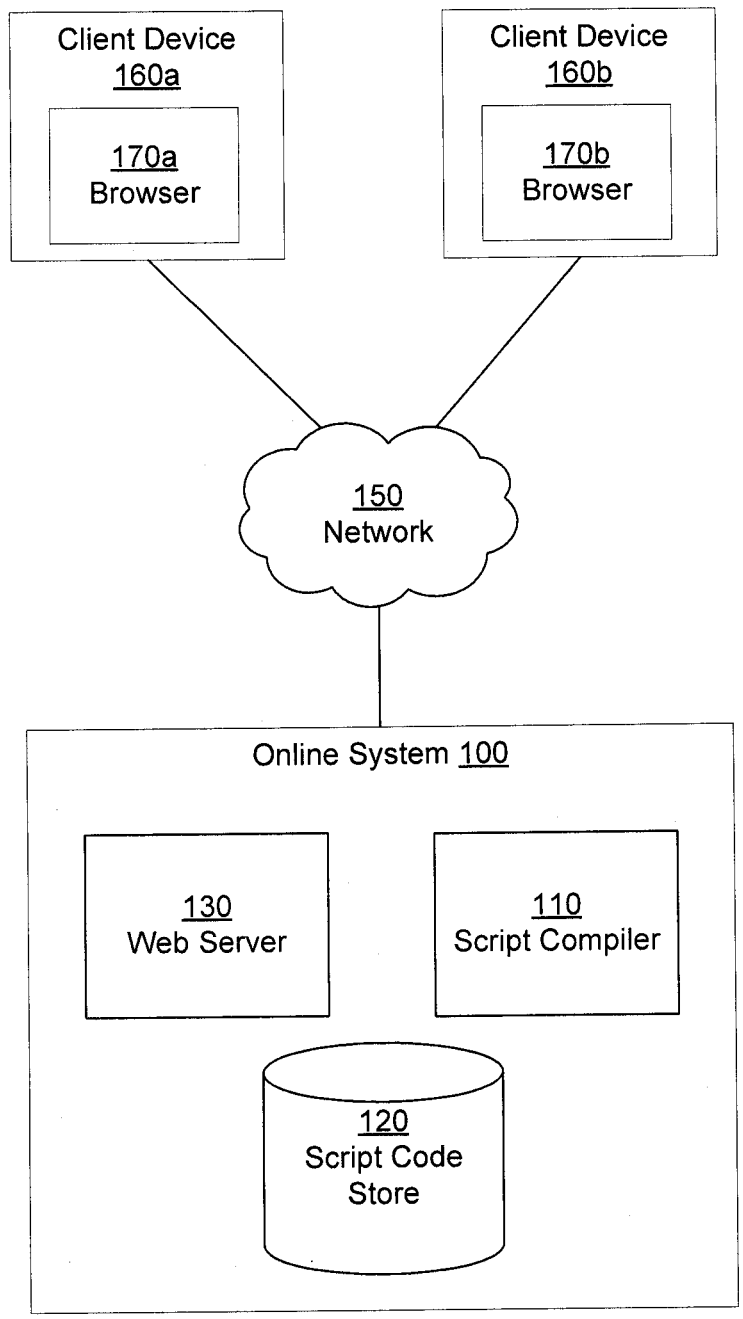
FIG. 1 is an environment in which an embodiment of the disclosed technique may operate.

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

A software source code compiler can translate a source program first to some form of an intermediate representation (IR) and then convert the IR into machine code or executable code. In an embodiment, the IR is a machine-and-language independent version of the source code. Use of an IR provides advantages in increased abstraction, cleaner separation between the front and back ends, and adds possibilities for cross-compilation among various type of systems and/or languages. IRs also lend themselves to supporting advanced compiler optimizations. Further, different compilers can generate different types of IR.

Disclosed here are methods, systems, paradigms and structures for optimizing an IR of the script code for a fast path execution. A fast path is typically a path with shorter instruction path length through a program compared to other paths, referred to as slow paths. Generally, a fast path handles the most commonly occurring tasks more efficiently than the less commonly occurring ones. The slow paths handle the less commonly occurring tasks, which may include uncommon cases, error handling, and other anomalies. The IR is optimized for the fast path by generating checkpoints in the IR as labeled checkpoints. A checkpoint includes a condition that evaluates to one of two possible values and results in either a fast path or slow path execution. A labeled checkpoint includes a label that identifies a portion of the IR to which the execution of the script code is transferred when the labeled checkpoint evaluates to a value that results in a slow path (value that is less commonly occurring). The code in the portion of the IR following the labeled checkpoint is generated/optimized considering the labeled checkpoints evaluate to a value that results in fast path (value that is more commonly occurring).

The IR can include code such as code for tracking references to an object, checking data types of a variable, etc. The reference tracking code can include an operation such as (a) "decref" operation—code that decrements a reference count of an object when a programming construct such as a variable referring to the object is removed. In an embodiment, the decref operation can trigger the execution of a destructor, which is a user-defined code executed to perform certain operations, when the reference count of the object goes down to zero (due to which the object is deleted from the memory). Running the destructor can have adverse effects, such as causing to access an object which is removed from the memory, etc.

However, in typical scenarios, the probability of the reference count going down to zero is less than the probability of it being a non-zero value. In order to separate this less commonly occurring case of the reference count evaluating to zero, the decref code can be generated as a labeled checkpoint. The code for handling the less commonly occurring case is generated in the portion of the IR indicated by the label. The code that is generated in the portion following the decref operation is generated/optimized assuming that the reference count is not decremented to zero. Accordingly, in at least some embodiments, the IR need not include any code in the portion of the code following the decref code for performing the checks to avoid the effects caused due to the execution of the destructor. Such checks can be eliminated from the portion of the code following the decref code since the code in the portion following the decref code is generated assuming that the decref code does not decrement the reference count to zero. Accordingly, the resulting IR will have lesser checks. The resulting executable code also will have lesser checks to perform, thereby minimizing the consumption of computing resources and enhancing the execution performance of the script code.

The IR for the script code could be in various formats that are in between the original source code and an executable code generated for a particular machine. The various formats can include a byte code, a low level language code, or any other human understandable format. The script code can be written in various programming languages, including PHP (Personal Home Page), and programming languages that provide support for either a single-threaded execution or multi-threaded execution. The embodiments of the disclosed technique are described with reference to FIGS. 6-11. Further, the above described embodiments may be performed in various environments, including the environments described in association with FIGS. 1-5.

FIG. 1 shows a system environment for allowing a client device to interact with an online system that generates dynamic web pages by compiling script code, in accordance with an embodiment of the disclosed technique. FIG. 1 illustrates client devices 160 interacting with an online system 100 using the network 150. The client devices 160 send requests to the online system 100 via the network 150. The online system 100 may dynamically generate web pages in response to the request and send the generated web pages to the client device 160 in response to the request.

FIG. 1 and the other figures use like reference numerals to identify like elements. A letter after a reference numeral, such as "160*a*," indicates that the text refers specifically to the element having that particular reference numeral. A reference numeral in the text without a following letter, such as "160," refers to any or all of the elements in the figures bearing that reference numeral (e.g. "160" in the text refers to reference numerals "160*a*" and/or "160*b*" in the figures).

Embodiments of the computing environment can have multiple client devices 160 and multiple online systems 100 connected to the network 150. Certain functionality described in one embodiment as being performed on the server side can also be performed on the client side in other embodiments if appropriate. For example, although FIG. 1 shows the script compiler 110 running on the online system 100 for compiling server side script code, in other embodiments, the script compiler 110 may run on the client device 160 for compiling client side script code. In addition, the functionality attributed to a particular component can be performed by different or multiple components operating together.

The client devices 160 include one or more computing devices that can receive user input and can transmit and receive data via the network 150. The client device 160 can execute an application, for example, a browser application 170 that allows a user of the client device 160 to interact with the online system 100. A user may provide input using a user interface presented to the user via the browser application 170. The interactions of the user via the browser application 170 may cause the browser application 170 to send a request for information that identifies a markup language document including server side scripting code. The markup language document is processed to obtain a transformed markup language document that is returned in response to the request.

The network 150 uses standard communications technologies and/or protocols. Thus, the network 150 can include links using technologies such as Ethernet, 802.11, worldwide interoperability for microwave access (WiMAX), 3G, digital subscriber line (DSL), etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 170 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc.

The online system 100 comprises a web server 130, a script compiler 110 and a script code store 120. The web server 130 is a module processing requests received by the online system 100 from client devices 160 or other external systems that interact with the online system 100. The web server 110 may be implemented by conventional web server software, such as APACHE or INTERNET INFORMATION SERVICES. In response to a request from a client device 160, the web server 130 may invoke other modules of the online system 100 to process the request. For example, the web server 130 may invoke modules of the online system 100 to obtain a web page in response to the request from the client device 160. The web server 130 sends the web page to the client device 160 for presentation on the browser 170.

The script code store 120 stores script code that implements portions of functionality provided by the online system 100 to client devices 160. A script code may include a function, procedure, method, or a block of code that may be embedded within an HTML document. The script code implements functionality, for example, retrieving information stored in various databases of the online system 100, performing computations, or interacting with other systems.

The script compiler 110 takes script code in source code form and generates equivalent executable code for execution by a processor of the online system 100 (in this disclosure, the term "script code" is also referred to as "script.) In an embodiment, the script compiler 110 performs incremental compilation of the script code in a lazy fashion. For example, a portion of script code is compiled if a request causes this portion of script code to execute. Once a portion of the script code is compiled, the generated executable code is available for future requests. However, if no request received by the online system 100 needs to execute a particular portion of the script code, that particular portion may not be compiled. Therefore, no executable code corresponding to a particular portion of script may exist in the online system 100 if no request from a client device needs to execute that portion of script. For example, a script may include an "if-then-else" statement that executes an "if" portion of script if a condition evaluates to true and an "else" portion of script if the condition evaluates to false. If all incoming requests evaluate the condition to a true value, these request only execute the "if" part of the script. Accordingly, executable code corresponding to the "else" part of the "if-then else" statement may never be generated, unless an incoming request results in the condition being evaluated to a false value.

Figure 2:
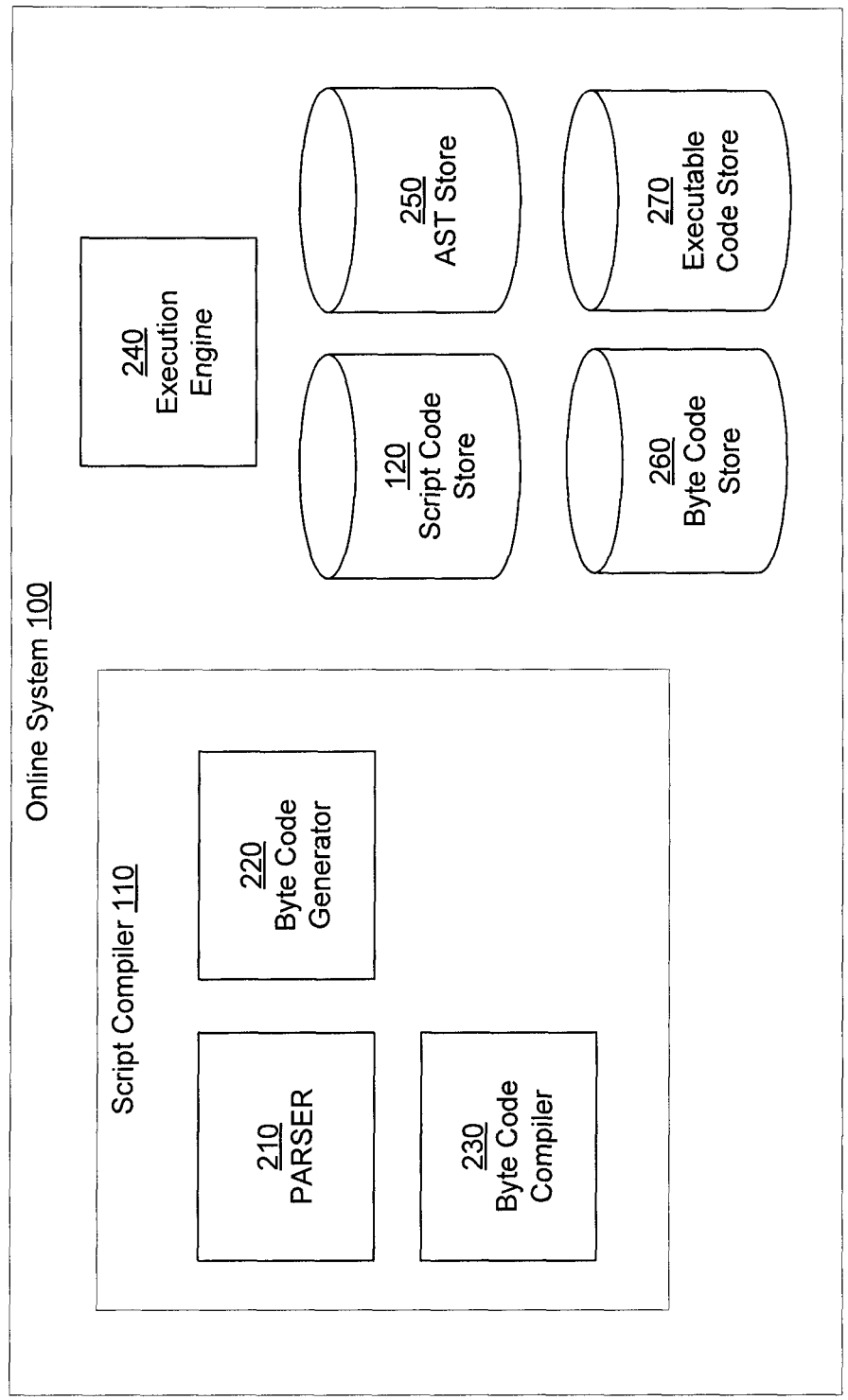
FIG. 2 is a block diagram illustrating an architecture of an online system that generates dynamic web pages by incrementally compiling script code at runtime.

FIG. 2 illustrates an architecture of an online system 100 that generates dynamic web pages by incrementally compiling script code at runtime, in accordance with an embodiment of the disclosed technique. The online system includes the script code store 120, an abstract syntax tree (AST) store 250, a byte code store 260, an executable code store 270, an execution engine 240, and the script compiler 110. The script compiler 110 further includes a parser 210, a byte code generator 220, and a byte code compiler 230. Some embodiments of the online system 100 have different and/or other modules than the ones described herein, and the functions can be distributed among the modules in a different manner than is described here. For example, several modules shown in the online system 100 may be present in a client device 160 if the script code being processed is client side script code.

The script code store 120 stores script code, for example, script code specified as PHP, server side JAVASCRIPT, or another syntax. The script code may be input by a software developer using an editor or copied from another computer. In an embodiment, the script code is specified in a human readable text form. The parser 210 reads the script code from one or more files in the script code store 120 and builds a data structure called an AST that is stored in the AST store 250. The AST is a hierarchical tree representation of script code. The parser 125 checks the script code for syntax errors and reports the errors to allow a user to correct the errors.

The byte code generator 220 traverses the AST representation of the script code and generates byte code corresponding to the script code. The byte code is stored in the byte code store 260. The byte code includes code represented using an instruction set that is designed for efficient execution by an interpreter or for efficient compilation into executable code, for example, machine code. The byte code instructions may correspond to a virtual stack machine or a virtual register machine. The byte code compiler 230 converts byte code into executable code and stores the generated executable code in the executable code store 270.

The execution engine 240 executes the instructions available in the executable store 270. For example, the execution engine 240 may be invoked in response to a request received from a client device 160. The execution engine 240 identifies executable code corresponding to the request received for execution. An online system 100 may compile all available byte code stored in the byte code store 260, for example, as a batch process and store the generated executable code in the executable code store 270. Compiling all available byte code store in advance ensures that executable code is readily available for any request that is received by the online system, so long as the corresponding script code is available in the script code store 120. However, script code typically supports features that make it difficult to generate efficient executable code. For example, script code may support untyped variable for which the type is not available until runtime. Programmers often use untyped variables since they do not require the programmer to make early decisions regarding types of variables used. A programmer may specify a variable as untyped even if at runtime the variable only stores values of one particular type, for example, an integer value. In practice significant amount of script code is executed based on a limited set of types corresponding to the untyped variables. However, if the online system 100 compiles the byte code to executable code prior to receiving the requests at runtime, the type information may not be available for the variables. A byte code compiler 230 that compiles the byte code without making any specific assumptions about the types of the variables may generate inefficient executable code since the generated executable code accounts for all possible types that each untyped variable may take, whether or not the incoming requests use these types.

Embodiments of the byte code compiler 230 compile byte code to executable code based on information available at runtime. For example, the byte code compiler 230 may utilize type information of variables obtained during an execution of the script code to generate executable code optimized for these specific types. Accordingly, executable code required for executing a request may or may not be available in the executable code store 270 at runtime. If executable code corresponding to the request is not available in the executable code store 270, the execution engine 240 identifies byte code corresponding to the request from the byte code store 230. The execution engine 240 invokes the byte code compiler 230 to compile the byte code corresponding to the request to generate executable code. The execution engine 240 provides type information of variables obtained during the current execution of the script code to the byte code compiler 230. Accordingly, the byte code compiler 230 generates efficient executable code based on the type information of variables available. The execution engine 240 executes the generated executable code. In some embodiments, executable code may be generated directly from script code without requiring byte code generation.

If future executions of the script code provide variables of the same type as the first request, the executable code can be reused for the future requests. However, if a subsequent execution provides a different combination of types of variables compared to the first execution, the execution engine 240 invokes the byte code compiler 230 to generate executable code corresponding to the new combination of types corresponding to the variables. Accordingly, the executable code store 270 may store different executable codes for the same byte code program, each executable code corresponding to a different combination of variable types. The byte code compiler 230 may never generate executable code corresponding to type combinations that are never received in executions of the script code.

In an embodiment, the byte code compiler 230 compiles a basic block of byte code at a time. A basic block of code has one entry point, i.e., no instruction within the basic block other than the entry point can be reached from anywhere in the script code as a destination of a jump instruction. The entry point is typically the first instruction of the basic block. A basic block may have one or more exit point, i.e., typically the last instruction of the basic block causes the program control to start executing another basic block. The last instruction may evaluate certain condition and determine the next basic block for execution based on the result of the evaluation of the condition. For example, the last instruction may evaluate a binary condition and transfer program control to one basic block if the condition evaluates to true otherwise transfer program control to another basic block (if condition evaluates to false). Similarly, the last instruction of the basic block may transfer control to different basic blocks based on the value of a particular variable. For example, if the variable value is 1, program control is transferred to basic block B1, if the variable value is 2, program control is transferred to basic block B2, if the variable value is 3, program control is transferred to basic block B3, and so on. The simple structure of a basic block makes it easy for the byte code compiler 230 to optimize and compile a basic block.

The executable code of the script includes executable blocks (also referred as "executable basic blocks") of the script and/or executable control regions of the script. An executable block corresponds to a basic block of the script (which is described in further detail with reference to FIGS. 4 and 5), whereas an executable control region of the script includes instructions for executing a set of basic blocks. An executable control generator 235 generates an executable control region for a set of basic blocks based on various criteria (which is described in further detail with reference to FIGS. 6-10).

Figure 3:
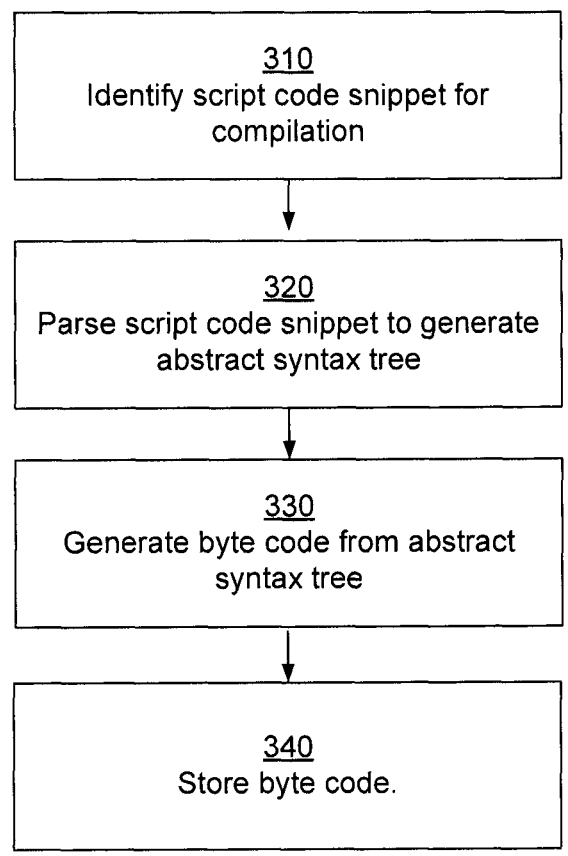
FIG. 3 is a flow diagram illustrating the process of compiling script code.

FIG. 3 is a flow diagram illustrating the process of compiling script code, in accordance with one embodiment of the disclosed technique. The process illustrated in FIG. 3 may be executed by the script compiler 110 as a batch process that compiles script code stored in the script code store 120. For example, software developers may periodically provide new scripts implementing certain features of the online system 100. The received script code may be compiled as a batch process by the online system 100. Alternatively, software developers may update existing script code, thereby requiring recompilation of the updated script code. The script compiler 110 may repeat the steps shown in FIG. 3 for all the script code that need to be recompiled.

The script compiler 110 identifies 310 a script for compilation. The script compiler 110 invokes the parser 210 for parsing the script. The parser 210 parses 320 the script code to generate an AST representation of the script code. The parser 210 stores the AST representation in the AST store 250. In an embodiment, modules of the script compiler 110 perform various operations using the AST representation, for example, static analysis, type inference, and optimizations. As a result, the script compiler 110 may annotate the AST and/or transform the AST. The script compiler 110 stores the annotated ASTs or the transformed ASTs in the AST store 250. Each step performed by the script compiler 110 typically use the latest version of the AST from the AST store 250 and generates a subsequent version of the AST. The byte code compiler 230 generates 330 byte code from the AST representation of the script code and stores 340 the generated byte code in the byte code store 260.

The byte code compiler 230 incrementally compiles the byte code stored in the byte code store at runtime to generate corresponding executable code. The byte code compiler 230 performs the incremental compilation responsive to executions of the script code, for example, executions caused by requests received from client devices 160.

In at least some embodiments, the execution engine 240 requests compilation of one basic block of byte code at a time. More specifically, the execution engine 240 requests compilation of one basic block for a particular combination of types of the variables as required for execution of an incoming request. In at least some other embodiments, the execution engine 240 may request compilation of a group of basic blocks to generate more optimal executable code. Additionally or alternatively, the execution engine 240 may request the compilation of one basic block during a first phase of execution of the script, and request compilation of group of basic blocks during a second phase of execution.

Figure 4:
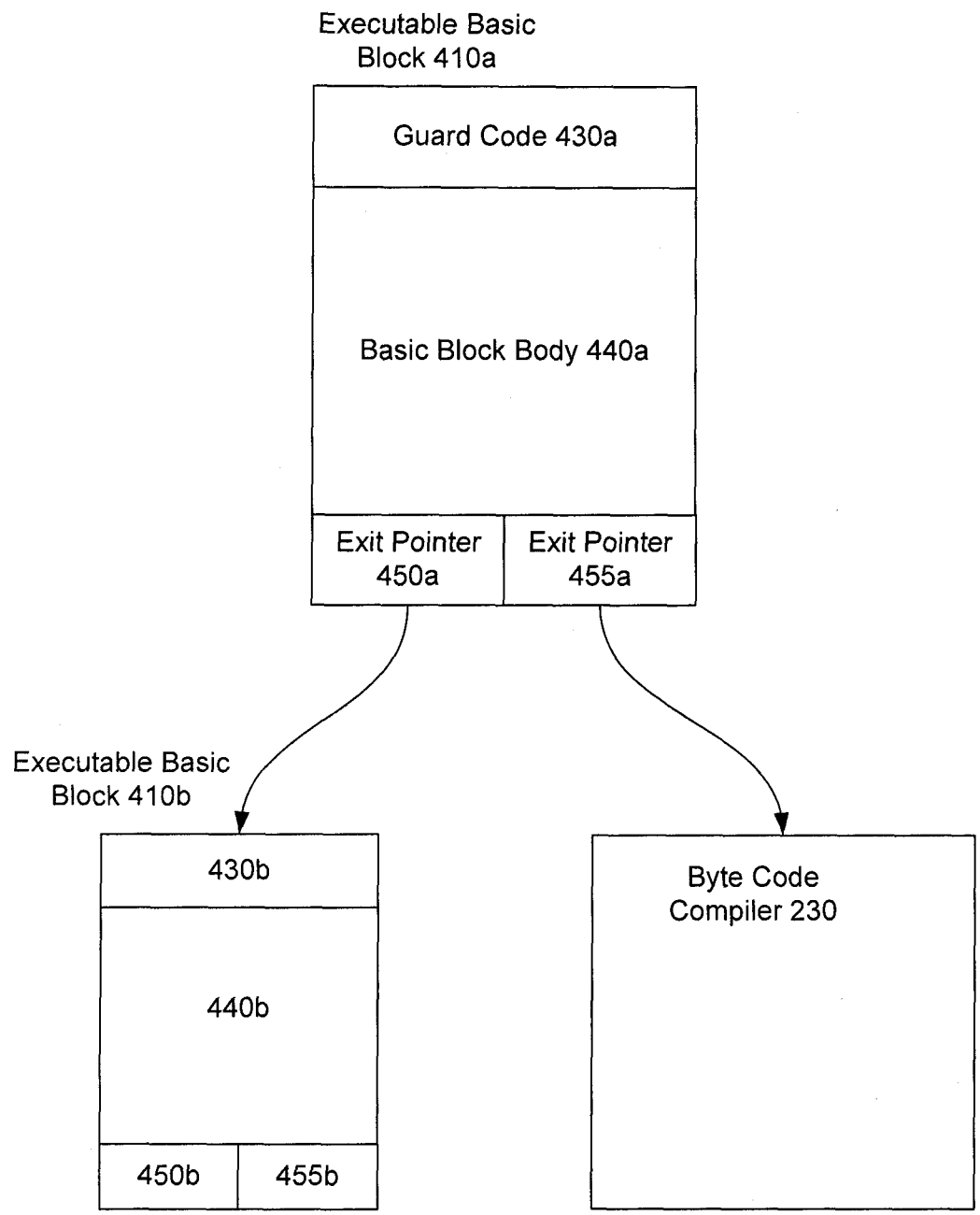
FIG. 4 illustrates the structure of executable code generated by a script compiler.

FIG. 4 is a diagram illustrating the structure of executable code generated by a script compiler, in accordance with one embodiment of the disclosed technique. The generated executable basic block 410 includes a portion of guard code 430, a basic block body 440, and one or more exit pointers 450. The executable basic block 410 is generated in response to receiving a request from the client device 160. Accordingly, the executable basic block 410 is optimized for the types of variables as provided by the incoming request.

The following example illustrates how executable code is generated for a given basic block. Assume that a basic block includes two untyped variables varA and varB. Further assume that for a particular execution it is determined that both variables varA and varB are integers. Accordingly, the byte code compiler 230 compiles the basic block to generate the basic block body 440 assuming the variables varA and varB are integers. The guard code 430 includes instructions that check a particular condition before executing the basic block body 440. In the above example, the generated guard code 430 verifies that the types of variables varA and varB are integers. If the types of both variables are integers, the guard code 430 continues execution of the basic block body 440.

The last instruction of an executable basic block 410*a* that is executed typically causes the program control to begin execution of another executable basic block 410*b*. Accordingly, the last instruction of the executable basic block 410 may include an exit pointer 450 that specifies the address of an executable basic block 410*b* for execution after the execution of the executable basic block 410. The last instruction of an executable basic block 410*a* that is executed may transfer control to different executable basic blocks 410 depending on certain criteria. For example, the last instruction in a basic block may correspond to an "if" condition that executes one basic block if the condition is evaluated to true and another basic block if the condition is evaluated to false. Therefore, the last instruction of the executable basic block 410 may include one or more exit pointers 450a, 455a, and so on.

The exit pointer 450a points to another executable basic block 410b. If a particular executable block that needs to be executed subsequent to the execution of the executable basic block 410a has not been compiled so as to generate a corresponding executable basic block, the corresponding exit pointer 455a transfers control to the byte code compiler 230. The byte code compiler 420 may be provided with information describing the subsequent basic block that needs to be compiled. The address of the subsequent basic block may be communicated to the byte code compiler 230 using function-calling conventions of the native machine in which the system is hosted. In this embodiment, the byte code compiler 230 obtains the address of the byte code corresponding to the subsequent basic block to be compiled from the top of the stack. Once the byte code compiler 230 generates an executable basic block 410 corresponding to the subsequent basic block, the pointer 455a is changed to point to the generated executable basic block instead of the byte code compiler 230.

In at least some embodiments, the byte code compiler 230 generates different executable basic blocks for different combinations of type of the variables of a basic block. That is, the byte code compiler 230 generates one executable basic block for variable types integer, another executable basic block where both the variables are float, another executable basic block where one variable is integer and another is float and so on.

Further, in at least some other embodiments, the executable basic blocks may be generated based on criterion other than type of variables in the basic block. The guard code would have instructions accordingly to verify the criteria based on which the executable block is created before the basic block body of the executable block is executed.

Figure 5:
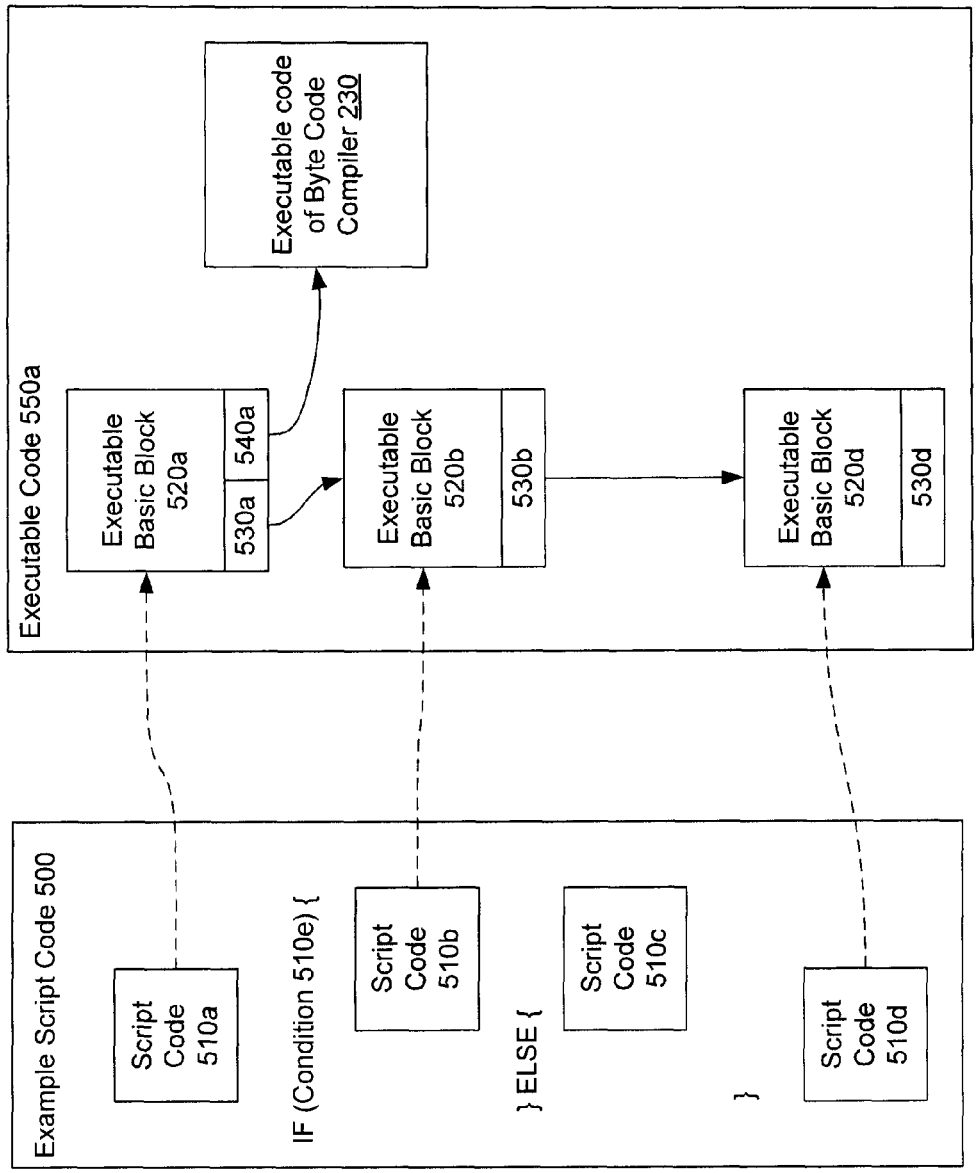
FIG. 5 is a block diagram illustrating incremental compilation of byte code obtained from an example script code.

FIG. 5 illustrates incremental compilation of byte code obtained from an example script code, in accordance with one embodiment of the disclosed technique. FIG. 5 shows an example script code 500 executed in response to a request from client device 160. The example script code 500 includes a portion of byte code 510a followed by an if-then-else statement, followed by another portion of byte code 510d. The if-then-else statement includes a condition 510e, a portion of byte code 510b that is executed if condition 510e evaluates to true, and a portion of byte code 510c that is executed if the condition 510e evaluates to false.

Assume that a request is received from a client 160 that includes values of variables that result in the condition 410e evaluating to true. The resulting executable code generated by the byte code compiler 230 includes the executable code 550a shown in FIG. 5. The portion of script code 510a combined with the condition 510e corresponds to executable code 520a. The executable code 520 includes a guard code 430 in the beginning to verify whether the types of the variables correspond to a specific combination. The end of the executable code 520a includes instructions evaluating the condition 510e. If the condition 410e evaluates to true, the program control is transferred according to exit pointer 530a otherwise the program control is transferred according to exit pointer 540a.

Since the current request received from the client 160 results in the condition 410e evaluating to true, the executable basic block 520b corresponding to portion of script code 510b is also generated. The script code 500 shows that after execution of script code 510b, the script code 510d is executed. Accordingly, the executable basic block 520d corresponding to the script code 510d is also generated. For the execution of the current request, the script code 510c is never executed since it corresponds to the "else" portion of the if-the-else statement that is not executed when the condition 510e evaluates to true. Accordingly, the end of executable basic block 520a includes an exit pointer 540a pointing to the byte code compiler 230 with information identifying byte code corresponding to script code 510c.

If several subsequent requests all include variables with types matching those corresponding to the previous request and result in condition 510e evaluating to true, the executable code 550a can be executed to process these requests. A new set of executable code 550 may be generated if a request is received that requires execution of script code 500 with a new combination of types of variables, different from those corresponding to executable code 550. However, if all requests received from the client device 160 continue providing the same combination of variable types and always result in the condition 510e evaluating to true, the executable code 550 continues to process the requests and no new executable code needs to be generated.

If at any stage, an execution of the script code is performed that provides the previous combination of variable types that cause the condition 510e to evaluate to false, the exit pointer 540a causes the byte code compiler 230 to be invoked causing an executable basic block to be generated corresponding to the script code 510c. The script compiler 110 changes the exit pointer 540a to point to the generated executable basic block instead of the byte code compiler 230. Since the execution of the script code 510c is followed by the execution of the script code 510d, the exit pointer at the end of the executable basic block is configured to point to the executable block 520d corresponding to script code 510d. The executable code 550a which now includes executable block for script code 510c can process requests that result in the condition 510e evaluating to true as well as false without having to invoke the byte code compiler 230. Furthermore, the executable basic block for script code 510c is not generated unless an execution that causes the condition 510e to evaluate to false is received. Accordingly, the script compiler 110 generates executable code in a lazy fashion, the generation performed only if a request requires certain portion of script code to be executed. As a result, the script compiler 110 does not generate dead code, i.e., code that is never executed.

In at least some embodiments, the execution of the script can be further optimized by generating a single executable control region for a set of basic blocks of the script. The executable control region having instructions for executing a set of basic blocks can be generated by combining the executable basic blocks generated for each of the set of basic blocks. The execution engine 240 executes the executable control regions in subsequent requests to execute the executable blocks. The time taken to generate or load one executable control region per multiple basic blocks is lesser compared to the time taken to generate or load one executable block per each of the multiple basic blocks. Accordingly, the efficiency of execution of the script is improved by executing one executable control region instead of executable blocks. However, to combine appropriate executable blocks, the byte code compiler 230 has to have knowledge or context of a set of executable blocks. Since the executable blocks are generated on a need basis, the execution engine 240 may not have the knowledge or context of a group of executable blocks. Accordingly, the execution engine 240 may have to wait until necessary knowledge for further optimization is obtained.

In at least some embodiments, the execution of the script code 500 is optimized using an intermediate representation (IR) of the script code. Typically, a compiler, such as a byte code compiler 230, translates the script code first to some form of IR and then convert the IR into machine code/executable code such as executable blocks of FIGS. 4 and 5. The IR includes a checkpoint that evaluates to a first value or a second value. While the checkpoint evaluates to the first value in most cases (fast path), it evaluates to the second value in lesser cases, which typically are error handling (slow path) cases. The generation of the code in the portion following the checkpoint depends on the value of the checkpoint. The disclosed embodiments optimize the IR for fast path execution.

Figure 6:
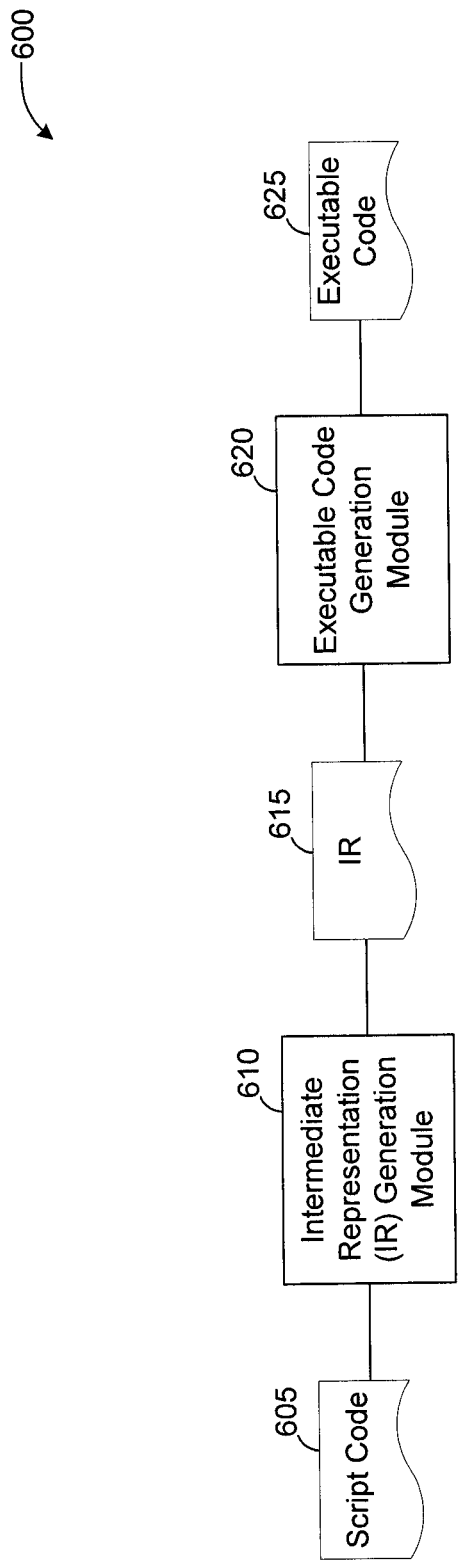
FIG. 6 illustrates a block diagram of a system for generating an intermediate representation (IR) of a script code and converting the IR to executable code for executing the script code.
Figure 7:
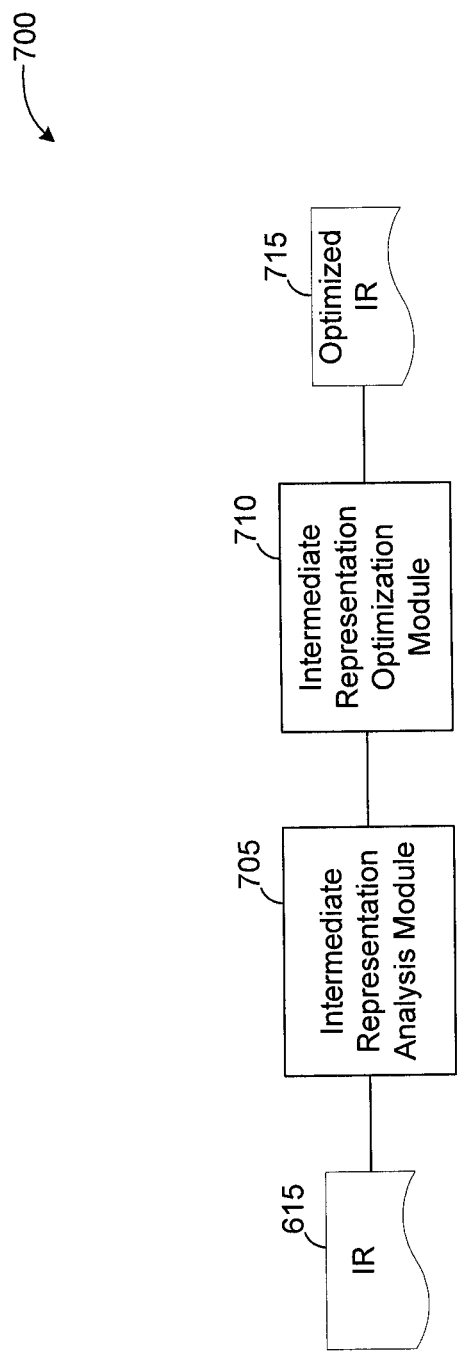
FIG. 7 illustrates a block diagram of a system for optimizing the IR of the script code for fast path execution.
Figure 8:
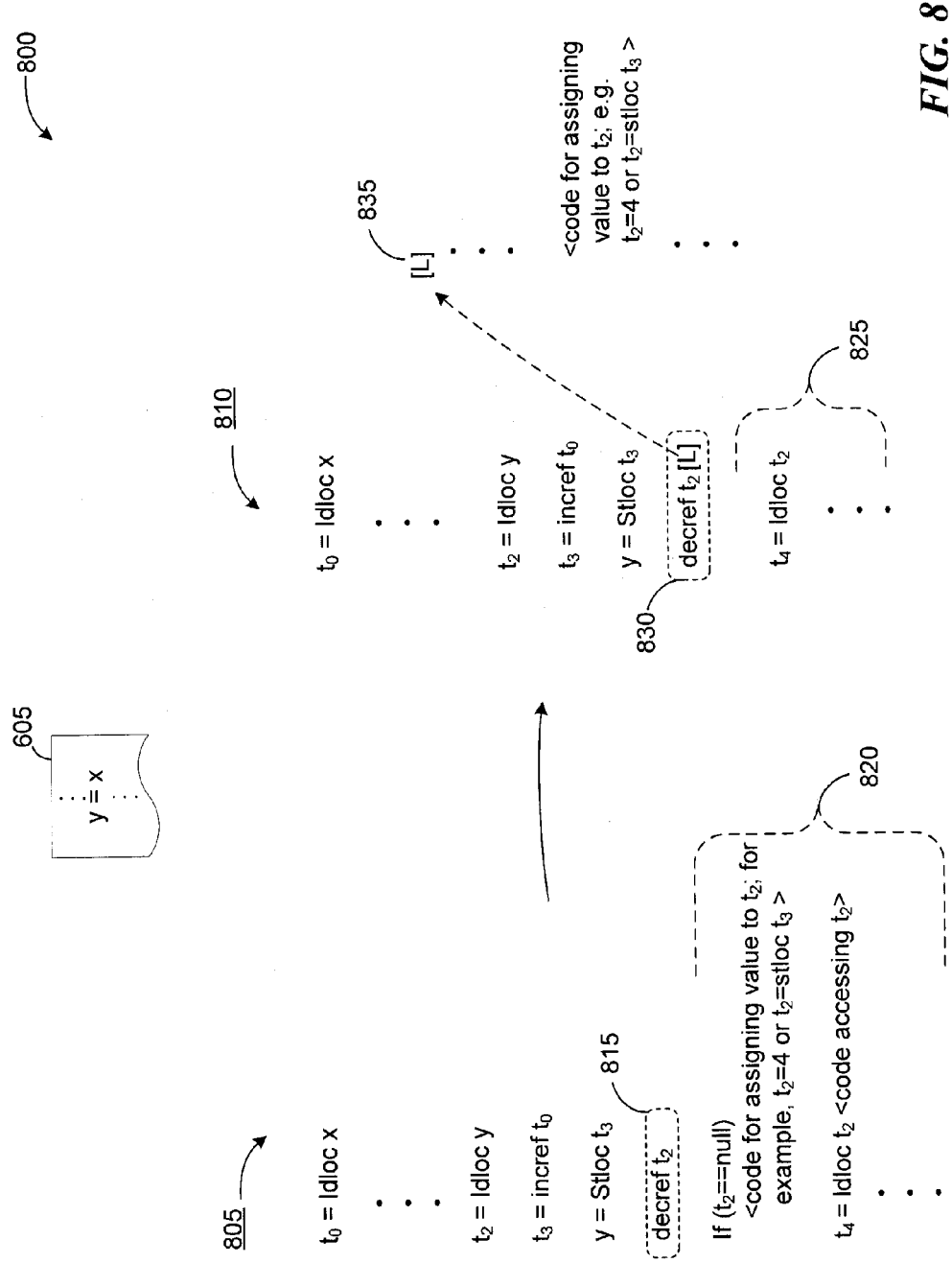
FIG. 8 illustrates an example of optimizing an IR of script code for fast path execution by regenerating a checkpoint in the IR as a labeled checkpoint.

FIGS. 6-8 provide examples of generating an IR of a script code, and optimizing the IR based on an analysis of code for reference count of an object. FIG. 6 illustrates an example environment 600 in which an embodiment of the disclosed technique may operate. The environment 600 includes an IR generation module 610 to generate an IR 615 of script code 605, and an executable code generation module 620 to generate an executable code 625 based on the IR 615. The script code 605 and IR 615 can take various forms. For example, the script code can be similar to script code 500, byte code as described in FIG. 2, or can include code written in programming languages other than PHP, such as Java, C++, etc. The IR 615 can be generated as a byte code of FIG. 2, or in formats other than the byte code, or in any form between the script code 605 and executable code 625. The executable code 625 is a code generated for a particular type of processor.

In an embodiment, the environment 600 can be part of online system 100, and therefore, the script code 605 can be similar to script code 500 of FIG. 5, the IR 615 can be similar to the byte code described with reference to FIG. 2 or can be generated from the byte code in a form between the byte code and the executable blocks of FIGS. 4 and 5, and the executable code 625 can include executable blocks such as executable basic blocks of FIGS. 4 and 5.

The IR 615 includes code for tracking reference count of an object, that is, number of references, entities, or pointers pointing to an object allocated in the memory, code for checking data type of an object, etc. The reference count operations include (a) "incref" code—code for incrementing a reference count of an object when a programming construct such as a variable refers to the object, and (b) an associated "decref" code—code for decrementing the reference count of the object when a reference to the object is removed.

Further, the decref code can trigger the execution of a user-defined code, such as a destructor, when the reference count of the object goes down to zero. In an embodiment, the destructor is typically executed to perform certain user defined operations when the object is deleted from the memory. Executing the destructor can have adverse effects on execution of the code following the decref code that triggered the destructor. Adverse effects include, for example, accessing of an object that is deleted from the memory, changing of the data type of an object, etc. Accordingly, in order to ensure these adverse effects are minimized, the IR 615 also includes code for performing the necessary checks, such as whether an object is null or whether a data type of a variable is as expected, etc. at every portion in the IR 615 where the object which could have been affected is accessed. The amount of code generated for these checks is significant, which also consumes significant computing resources during execution.

In an embodiment, the IR 615 is optimized to eliminate these checks before it is converted into executable code 625. FIG. 7 illustrates a block diagram of a system 700 to generate an optimized IR for a script code by generating checkpoints in the IR as labeled checkpoints, according to an embodiment of the disclosed technique. In an embodiment, the system 700 can be part of online system 100. The system 700 includes an IR analysis module 705 that is configured to identify the checkpoints that can be generated as labeled checkpoints. The checkpoints can include conditions, operations, or other code that evaluate to one of two possible values which result in either a fast path execution or slow path execution of the script code. As described earlier, a label identifies a portion of the IR 615 that includes code for handling a situation where the labeled checkpoints evaluate to a value that occurs less commonly (slow path) or which is expected to occur lesser than the other value. The label can be implemented as, for example, a number or alphanumeric.

Examples of checkpoint that can result in slow path or fast path execution include a decref operation that decrements the reference count of an object. The decref operation can evaluate to a zero when the reference count of an object is decremented to zero, which happens when the object is not being used any more. In an embodiment, the decref operation can evaluate to a non-zero value more often than zero. Accordingly, IR analysis module 705 determines that the decref operation can be implemented as a labeled checkpoint.

In another example, code for checking whether the data type of an object is of an expected type can evaluate to true or false values. In an embodiment, the data type of an object can be of an expected type more often than it is not. Accordingly, the IR analysis module 705 determines that the code for checking the data type of an object can be implemented as a labeled checkpoint.

An IR optimization module 710 regenerates the identified checkpoints as labeled checkpoints in the resulting optimized IR 715. For instance, in the above described example, the decref operation may be regenerated as a labeled decref operation. In an embodiment, the labeled decref operation can have the syntax "decref [variable name] [label]." The user may decide which of the two values the decref operation evaluates to should be handled by the code generated in the portion of the label. For example, if a particular decref operation evaluates to a non-zero value more often (fast path) than it evaluates to zero (slow path), the user may decide to generate the code for handling the zero case in the portion of the IR 715 indicated by the label. This way, the user may optimize or generate the code in the main path of execution (fast path—the path executed when the reference count is not zero) considering that the labeled decref operation does not evaluate to zero. That is, the user may eliminate code for performing any necessary checks to avoid the adverse effects that could have been caused due to the execution of the destructor.

Similarly, for a checkpoint which determines if the data type of an object is of an expected data type, if the checkpoint evaluates to a true value more often than a false value, the user may configure the IR optimization module 710 to generate the code for handling the case where the data type is not of the expected type in the portion of the IR 715 indicated by the label. Thus, the IR 715 is optimized for a fast path.

The analysis and optimization of the IR 615 is described with an example in association with FIG. 8. FIG. 8 illustrates an example 800 of optimizing an IR 805 of a script code 605 by regenerating the decref operation in the IR 805 as a labeled decref operation in optimized IR 810, according to an embodiment of the disclosed technique. The script code 605 can be executed in a system such as system 700. Consider that a portion of script code 605 includes a line of code for copying a value of one variable to another, such as "y=x." That is, a value of variable x is copied to variable y. The variable x can be assigned to an object of any data type, including float, integer, array or a user-defined data type. Typically, when a variable of a particular data type is initialized, the system allocates a portion of the memory to an object "pointed to" or "referred by" the variable. For example, when a variable x is assigned an object of a particular data type, the system allocates a portion of the memory to the object pointed to or referred by x. When the value of variable x is copied to variable y, y also points to the object. During the execution of the script code 605, the object assigned to a variable may be copied to various other variables, or the assignment to a particular variable may be overwritten. The number of pointers or references to the object may increase or decrease accordingly.

The following describes optimizing the IR 805 to the optimized IR 810 by regenerating the checkpoints as labeled checkpoints. The IR 805 includes a decref operation 815 such as "decref $t_2$" which decrements the reference count of the object pointed to by $t_2$, when, for example, $t_2$ is overwritten by a new value or is not pointing the object it pointed to anymore. In the example, since y is overwritten with another value, the reference count of the object to which y was pointing to earlier (now pointed to by $t_2$ by the virtue of "$t_2$=Idloc y,") is decremented. The reference count of the object pointed to by $t_2$ may result in a zero or non-zero value. If the reference count is decremented to zero, the object may be deleted from the memory, a process also known as "garbage collection." As part of garbage collection, the user may also request the system to execute a destructor. Since the destructor may have adverse effects such as causing to access an object that is deleted from the memory, the IR 805 includes code in the portion 820 following the decref operation 815 for performing checks to avoid the adverse effects.

One example of an adverse effect when the reference count of the object pointed to by $t_2$ goes down to zero includes occurrence a null pointer exception when variable $t_2$ is accessed (since the object may be deleted). To avoid this exception, includes code for checking if $t_2$ is null. Such code is generated in portion 820, that is, portion of IR 805 following the decref operation 815 which can be adversely effected. The destructor may have a number of other adverse effects such as changing the value, data type of a variable, etc. Accordingly, the portion 820 may have to include code for performing checks for each of the adverse effects. Further, the checks may have to performed at every instance the affected variable(s) is used.

The IR analysis module 705 identifies the decref operation 815 as a potential checkpoint for optimization and indicates to the IR optimization module to generate the decref operation 815 as a labeled decref operation 830 in the optimized IR 810. In generating the labeled decref operation 830, the user may configure, as described above with reference to FIG. 7, the IR optimization module 705 to optimize the IR 805 based on any of the two values the decref operation 815 evaluates to. For example, the user may choose to optimize based on fast path—a path executed for a value which the decref operation 815 evaluates to (a) with a frequency above a predefined threshold, or (b) more often than the other value. In the above example, consider that decref operation 815 evaluates to a non-zero value more often (fast path) than it evaluates to zero (slow path). Accordingly, the IR optimization module 710 generates the code for handling the zero case, in the portion of the optimized IR 810 indicated by the label 835. Further, the IR optimization module 710 optimizes the code in the fast path of execution, that is, in portion 825 following the labeled decref operation 830 assuming that the labeled decref operation 830 evaluates to non-zero value (that is, assuming that destructor is not executed).

As a result of the optimization, the code for performing checks (such as the code in portion 820) to avoid the adverse effects of destructor may be eliminated from the portion 825. Accordingly, in the resulting portion 825, the variables that could be potentially affected from the execution of the destructor can be accessed directly without including the code for performing these checks. During execution of the script code 605, as long as the labeled decref operation 830 evaluates to non-zero value, the control remains on the fast path and since the code for performing these checks is eliminated from the fast path, the execution is significantly improved.

Figure 9:
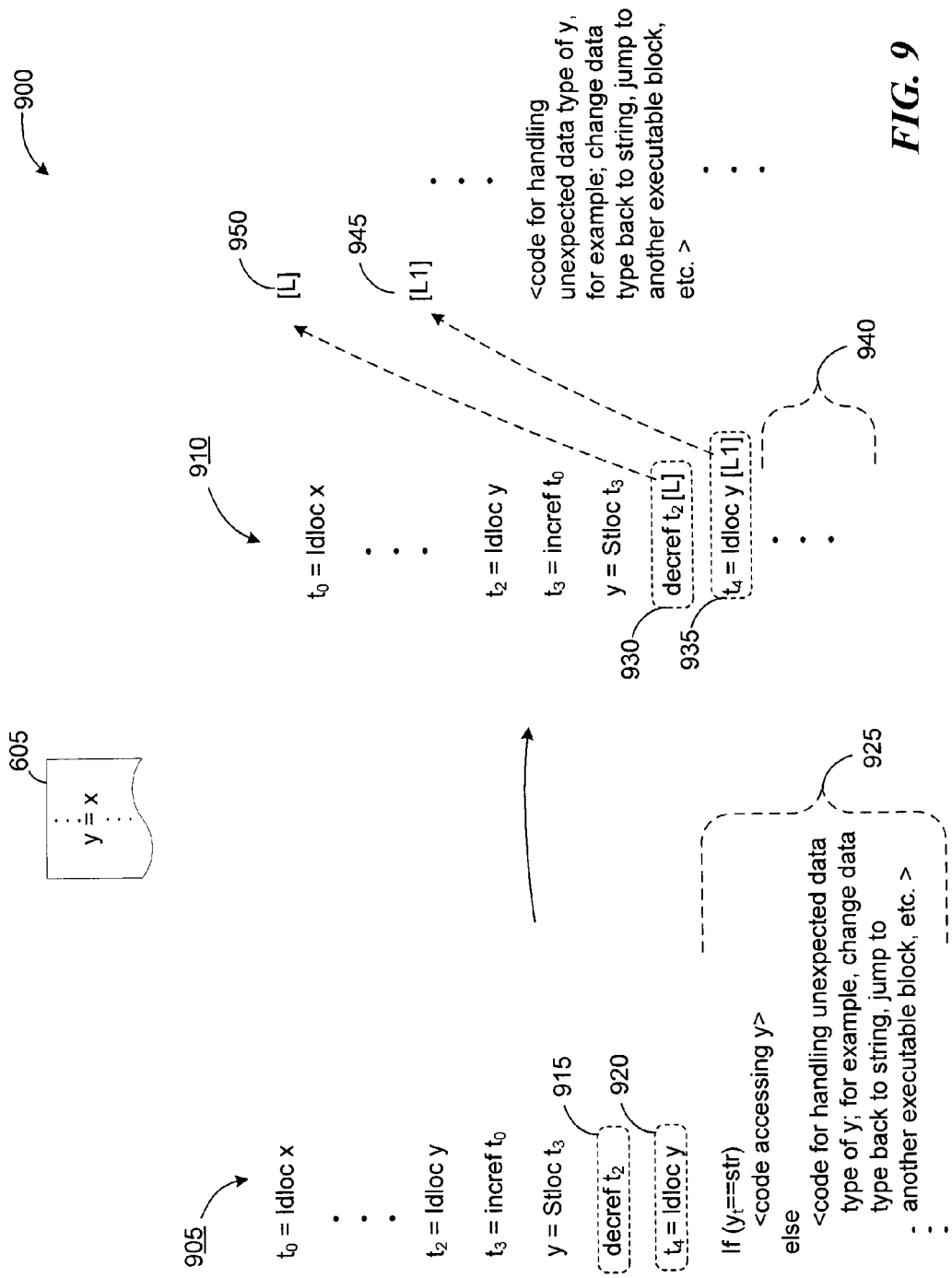
FIG. 9 illustrates another example of optimizing an IR of script code for fast path execution by regenerating a checkpoint in the IR as a labeled checkpoint.

FIG. 9 illustrates another example 900 of optimizing an IR 905 of a script code 605 by regenerating a load operation of the IR 905 as a labeled load operation in optimized IR 910, according to an embodiment of the disclosed technique. The IR 905 is another example of intermediate representation for script code 605. The script code 605 can include certain variables, referred to as boxed variables, that may be accessed in a way that is not directly represented in the script code 605. Boxed variables are typically variables whose data type is guarded, that is, variables whose data type is not expected to change. For example, a global variable in the script code 605 having the same name as a local variable in a method can be a boxed variable. The script code 605 may modify the global variable, either the value or the data type, accidentally or intentionally, instead of the local variable.

Another example of boxed variables can include variables in the guard code of executable blocks such as executable basic block 410a of FIG. 4. The executable blocks, as described with reference to FIGS. 4 and 5, are executed based on the types of variables in the guard code 430. If the variables are not of expected type, the execution is transferred to another executable basic block which has the variables of the expected data type. However, in certain cases, even after the variables are checked and the execution of executable block has begun, the data type of a boxed variable may change during the course of execution of the executable block. The data type may change due to, for example, an adverse effect of executing a destructor, which can be triggered by an operation such as a decref operation 915.

One way of handling the above situation is to generate code after the decref operation 915, such as the code in portion 925 of the IR 905, for performing checks to minimize the adverse effects when the boxed variable such as variable y is accessed. For example, load operation 920 loads the value of variable y into $t_4$. In order to determine if the data type of y is "string", the type verification operation can include code "(if $y_t$==str)" as shown in portion 925 of the IR 905. Further, such code may have to be generated at every instance the boxed variable(s) are accessed.

However, similar to generating a labeled decref operation 830 as described with reference to FIG. 8, the load operation 920 may be generated as a labeled load operation 935 as shown in the optimized IR 910. In generating the labeled load operation 935, the user may configure, as described above with reference to FIG. 7, the IR optimization module 705 to optimize the IR 905 based on any of the two values the type verification operation evaluates to. For example, the user may choose to optimize based on fast path—a path followed for a value which the type verification operation evaluates to more often than not, or with a frequency above a predefined threshold. In the above example, consider that type verification operation evaluates to a true value more often (fast path) than it evaluates to false (slow path). That is, the data type of the variable is as expected most of the times. Accordingly, the IR optimization module 710 optimizes the IR 905 by separating the code for the fast path from the slow path. The IR optimization module 710 moves the code for handling the slow path, that is, false case from the main path of execution to the portion of the optimized IR 910 indicated by the label 945. Further, the portion of code following the labeled load operation 935, that is, portion 940 is generated assuming that the labeled load operation 935 does not evaluate to slow path value.

As a result of the optimization, the code for performing checks to avoid the adverse effects of destructor is eliminated from the portion 940 following the labeled load operation 935. During execution of the script code 605, as long as the labeled load operation 935 evaluates to true value, the control remains on the fast path, and since the code for performing these checks is eliminated from the fast path, the execution is significantly improved.

Further, since modifying the data type of an object could be one of the adverse effects of running the destructor, in at least some embodiments, the code for handling a case where the data type of the boxed variable is not as expected may be combined with the code for handling the case where the reference count of the object is decremented to zero. That is, the code in the portion 945 corresponding to the label L1 of labeled load operation 935 can be combined with the portion 950 corresponding to the label L of the labeled decref operation 930 which handles the zero case of the reference count. Consequently, the labeled load operation 935 may be reverted to load operation 920 since the portion of the code following the labeled decref code operation 930 assumes that the destructor has not executed and therefore, the data type has not changed.

Figure 10:
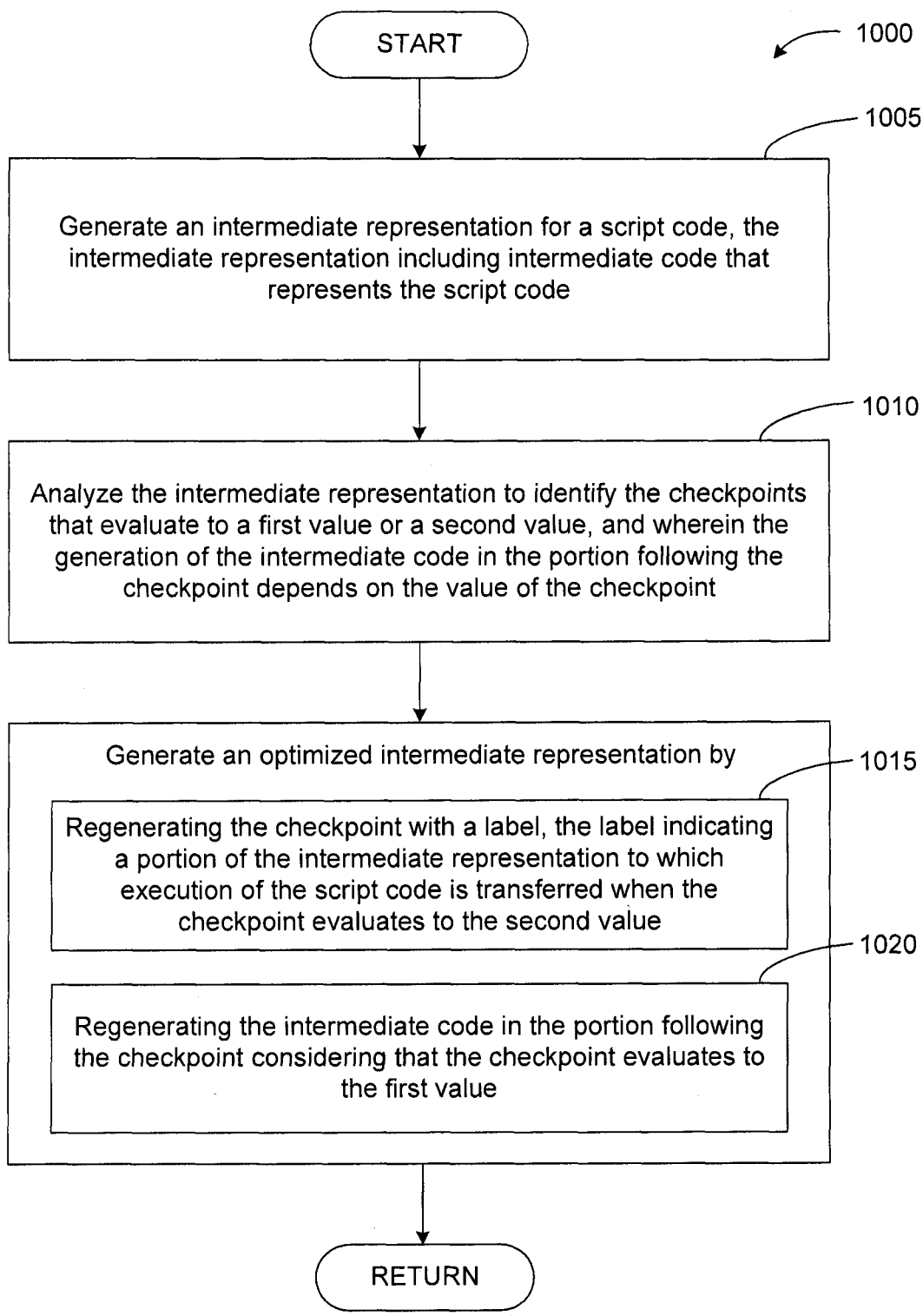
FIG. 10 is a flow diagram illustrating a process of optimizing the IR of the script code for fast path execution.

FIG. 10 is a flow diagram illustrating a process of optimizing an IR of script code, according to an embodiment of the disclosed technique. The process 1000 may be executed in a system such as online system 100 and/or system 700. At step 1005, the IR generation module 610 generates an IR for a script code. In an embodiment, the IR includes operations such as (a) incref and decref operations—for tracking a reference count of an object, (b) type verification operation—for verifying a data type of an object, etc.

At step 1010, the IR analysis module 705 analyzes the IR 810 to identify a checkpoint which includes a condition that evaluates to a first value or a second value. Also, generation of the IR in the portion following the checkpoint is dependent on a value the checkpoint evaluates to. In at least some embodiments, the checkpoint evaluates to the first value more often than it evaluates to the second value. In at least some embodiments, the first value results in a fast path execution and the second value results in a slow path execution. A fast path is typically a path with shorter instruction path length through a program compared to other paths which referred to as slow paths. Generally, a fast path handles the most commonly occurring tasks more efficiently than the less commonly occurring ones. The slow paths handle the less commonly occurring tasks, which may include uncommon cases, error handling, and other anomalies. In an embodiment, the execution path taken by the script code when the checkpoint evaluates to the first value is referred to as a fast path, and the path taken when the checkpoint evaluates to the second value is referred to as a slow path.

At step 1015, the IR optimization module 710 generates an optimized IR by regenerating the checkpoint as a labeled checkpoint. The label of a labeled checkpoint indicates a portion of the IR to which execution of the script code is transferred to when the checkpoint evaluates to the second value. At step 1020, the IR optimization module 710 further optimizes the IR by regenerating the code in the portion following the labeled checkpoint assuming that the labeled checkpoint evaluates to the first value.

In an embodiment, the script code 605 can be programmed to be executed in either a single threaded environment or a multi-threaded environment. In the multithreaded environment, the IR analysis module 705 ensures that the analysis, such as determination of whether the data type of the variable has changed, is performed considering all the threads executing the script code 605.

Figure 11:
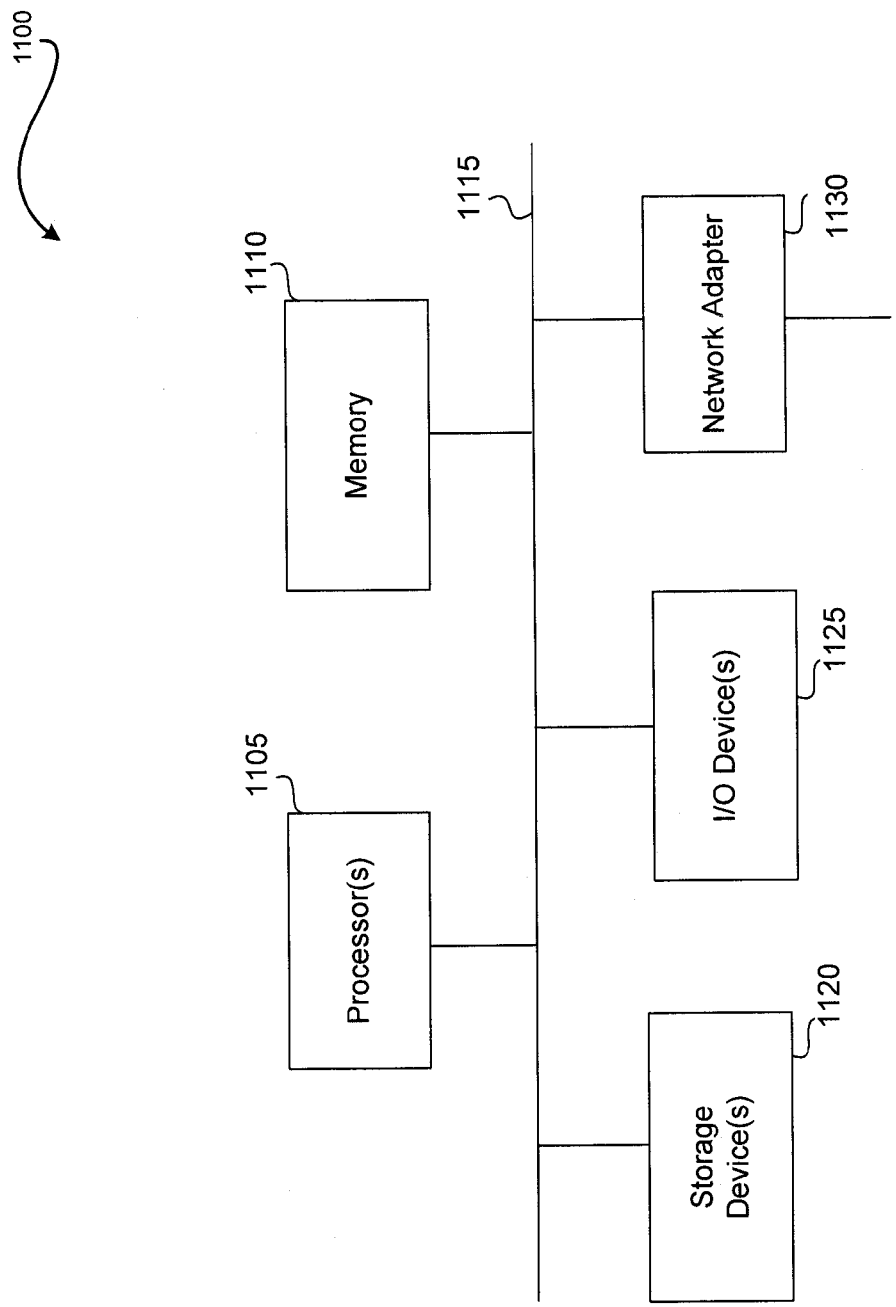
FIG. 11 is a block diagram of a processing system that can implement operations of the present invention.

FIG. 11 is a block diagram of an apparatus that may perform various operations, and store various information generated and/or used by such operations, according to an embodiment of the disclosed technique. The apparatus can represent any computer or processing system described herein. The processing system 1100 is a hardware device on which any of the entities, components or services depicted in the examples of FIGS. 1-10 (and any other components described in this specification), such as client device 160, online system 100, IR generation module 610, IR analysis module 705, IR optimization module 710, etc. can be implemented. The processing system 1100 includes one or more processors 1105 and memory 1110 coupled to an interconnect 1115. The interconnect 1115 is shown in FIG. 11 as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1105 is/are the central processing unit (CPU) of the processing system 1100 and, thus, control the overall operation of the processing system 1100. In certain embodiments, the processor(s) 1105 accomplish this by executing software or firmware stored in memory 1110. The processor(s) 1105 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1110 is or includes the main memory of the processing system 1100. The memory 1110 represents any form of random access memory (RAM), read-only memory (ROM), flash memory, or the like, or a combination of such devices. In use, the memory 1110 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 1105 through the interconnect 1115 are a network adapter 1130, a storage device(s) 1120 and I/O device(s) 1125. The network adapter 1130 provides the processing system 1100 with the ability to communicate with remote devices, over a network and may be, for example, an Ethernet adapter or Fibre Channel adapter. The network adapter 1130 may also provide the processing system 1100 with the ability to communicate with other computers within the cluster. In some embodiments, the processing system 1100 may use more than one network adapter to deal with the communications within and outside of the cluster separately.

The I/O device(s) 1125 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 1110 can be implemented as software and/or firmware to program the processor(s) 1105 to carry out actions described above. In certain embodiments, such software or firmware may be initially provided to the processing system 1100 by downloading it from a remote system through the processing system 1100 (e.g., via network adapter 1130).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 1120 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method, comprising:
    generating, by a computer, an intermediate representation of a script code from the script code, the script code expressed in a computer programming language;
    identifying, by the computer, a checkpoint in the intermediate representation, the checkpoint being a condition that evaluates to at least a first value or a second value, and wherein generation of the intermediate representation following the checkpoint is dependent on a value of the checkpoint, the checkpoint including a first intermediate representation for decrementing a reference count of an object;
    regenerating, by the computer, the checkpoint as a labeled checkpoint in a revised intermediate representation, the labeled checkpoint including a label referencing a first portion of the intermediate representation to which execution of the script code is to be transferred when the labeled checkpoint evaluates to the second value, wherein the first portion is separate from a main path of execution represented by an executable control region, the regenerating including regenerating the first intermediate representation to include the label, the label identifying the portion of the intermediate representation to which the execution of the script code is to be transferred when the reference count evaluates to zero; and
    regenerating the intermediate representation such that a second portion of the intermediate representation following the labeled checkpoint is in the main path of execution in which the labeled checkpoint evaluates to the first value.

2. The method of claim 1 further comprising:
    converting, at the computer, the revised intermediate representation to executable code in response to a request to execute the script code.

3. The method of claim 2 further comprising:
    executing, at the computer, the script code using the converted executable code in response to the request.

4. The method of claim 1, wherein the intermediate representation includes an additional checkpoint, the additional checkpoint including a condition to determine whether a data type of a programming construct is of a particular data type.

5. The method of claim 4, wherein regenerating the checkpoint as the labeled checkpoint includes regenerating the condition to include a specified label, the specified label identifying the portion of the intermediate representation to which the execution of the script code is transferred when the data type of the programming construct is not of the particular data type.

6. The method of claim 1, wherein the first value of the checkpoint causes the script code to execute in a fast path.

7. The method of claim 6, wherein the fast path includes a path of execution of the script code whose frequency exceeds a predefined threshold.

8. The method of claim 1, wherein the second value of the checkpoint causes the script code to execute in a slow path.

9. The method of claim 8, wherein the slow path includes a path of execution of the script code whose frequency is below a predefined threshold.

10. The method of claim 1, wherein the labeled checkpoint evaluates to the first value more frequently than to the second value.

11. The method of claim 1, wherein the labeled checkpoint evaluates to the first value when no errors are detected in the intermediate representation associated with the checkpoint.

12. The method of claim 1, wherein the labeled checkpoint evaluates to the second value when an error is detected in the intermediate representation associated with the checkpoint.

13. The method of claim 1, wherein regenerating the checkpoint as the labeled checkpoint includes:
    copying a set of the intermediate representation that is to be executed when the labeled checkpoint evaluates to the second value to the first portion, and
    deleting the set of the intermediate representation from the main path of execution, the set of intermediate representation in the first portion excluding intermediate representation that is to be executed when the labeled checkpoint evaluates to the first value.

14. A method, comprising:
    generating, by a computer, an intermediate representation of a script code from the script code, the intermediate representation including a function for decrementing a reference count of an object when a pointer referring to the object is removed, the script code expressed in a computer programming language;

determining, by the computer, whether the function includes a reference count condition that evaluates to at least a first value or a second value, and wherein generation of code following the function in the intermediate representation is dependent on evaluation of the reference count condition, and wherein the reference count condition evaluates to (a) a non-zero value if a number of pointers pointing to the object is greater than zero or (b) zero if there are no pointers pointing to the object;

regenerating, by the computer, the code for the function to include a label, the label indicating a first portion of the intermediate representation to which execution of the script code is to be transferred when the reference count condition evaluates to the second value, wherein the first portion is separate from a main path of execution, wherein regenerating the code for the function to include the label includes regenerating the function to include the label, the label indicating the first portion of the intermediate representation to which execution of the script code is to be transferred when the reference count condition evaluates to zero; and regenerating a second portion of the intermediate representation following the function, the second portion to be executed when the reference count condition evaluates to the first value, wherein the second portion remains in the main path of execution.

15. The method of claim 14, wherein the reference count condition evaluates to the non-zero value more frequently than to zero.

16. A system comprising:

a processor;

an intermediate representation generation module working in cooperation with the processor to generate an intermediate representation of a script code from the script code, the script code expressed in a computer programming language;

an intermediate representation analysis module working in cooperation with the processor to identify a checkpoint in the intermediate representation, the checkpoint being a condition that evaluates to at least a first value or a second value, and wherein generation of the intermediate representation following the checkpoint is dependent on an evaluation of a value of the checkpoint, the checkpoint including a first intermediate representation for decrementing a reference count of an object; and an intermediate representation optimization module that works in cooperation with the processor to:

regenerate, in the intermediate representation, the checkpoint as a labeled checkpoint, the labeled checkpoint including a label identifying a first portion of the intermediate representation to which execution of the script code is to be transferred when the labeled checkpoint evaluates to the second value, wherein the first portion is separate from a main path of execution, the intermediate representation optimization module further configured to regenerate the first intermediate representation to include the label, the label identifying the portion of the intermediate representation to which the execution of the script code is transferred when the reference count evaluates to zero, and regenerate the intermediate representation such that a second portion of the intermediate representation following the labeled checkpoint is in the main path of execution in which the labeled checkpoint evaluates to the first value.

\* \* \* \* \*